(12) United States Patent
Al-Jasim

(10) Patent No.: US 8,072,490 B2
(45) Date of Patent: Dec. 6, 2011

(54) PROHIBITED MATERIALS VEHICLE DETECTION

(76) Inventor: Khalid Ahmed S. Al-Jasim, Al-Shamiya (KW)

( * ) Notice: Subject to any disclaimer, the term of this patent is extended or adjusted under 35 U.S.C. 154(b) by 1238 days.

(21) Appl. No.: 11/749,221

(22) Filed: May 16, 2007

(65) Prior Publication Data

US 2008/0284846 A1 Nov. 20, 2008

(51) Int. Cl.
*A61B 1/06* (2006.01)
(52) U.S. Cl. ........... 348/82; 348/148; 348/375; 348/376
(58) Field of Classification Search .................. 348/148, 348/375, 376, 8, 82
See application file for complete search history.

(56) References Cited

U.S. PATENT DOCUMENTS

| | | | |
|---|---|---|---|
| 6,249,567 B1 * | 6/2001 | Rothschild et al. | 378/88 |
| 7,840,277 B2 * | 11/2010 | Matos | 607/60 |
| 2007/0273760 A1 * | 11/2007 | Morrison et al. | 348/51 |

* cited by examiner

*Primary Examiner* — Tammy Nguyen
(74) *Attorney, Agent, or Firm* — Lowe Hauptman Ham & Berner, LLP

(57) ABSTRACT

A device for inspecting the underside of a vehicle includes a carriage supported by four swivable wheels and a forwardly extending arm with a light source and upwardly extending camera on a forward portion thereof. A second arm extends rearwardly and upwardly from a rear portion of the carriage and includes a video monitor for viewing an image generated by the video camera and a control unit. The device also includes a video transmitter for sending a picture from the camera to a remote location and three 12 volt batteries for powering the device.

9 Claims, 4 Drawing Sheets

PROHIBITED MATERIALS VEHICLE DETECTION

FIELD OF THE INVENTION

This invention relates to an inspection device and more particularly to an inspection device for inspecting the underside of a vehicle for the presence of prohibited materials.

BACKGROUND FOR THE INVENTION

An increase in drug smuggling and terrorist activities have led to a demand for increased inspection of motor vehicles namely cars and trucks that travel from one country to another as well as those entering secure areas. As a result of the increase in terrorism, more and more hotels, hospitals, office buildings, etc. are erecting security barriers and limiting access to their facilities and inspecting those vehicles before the vehicles are permitted to enter the premises.

At many facilities, motor vehicles are inspected by checking the interiors of the vehicle, inspecting under the hood i.e. the engine compartment, trunk and using an inclined mirror to look under the outer periphery of the vehicle. At some facilities, inspectors use mirrors on an elongated handle that can be manipulated to allow minor movements.

For example, a U.S. Pat. No. 5,959,792 of Ibrahim displays a pole-type vehicle inspection apparatus having a motorized mirror capable of universal rotation about two axes. As disclosed, the device has a handle, a pole and a foot with a rotatable mirror mounted on the foot. The mirror is attached to the foot by a pivot shaft about which the mirror is capable of 2 degrees of rotational freedom in order to turn the plane of the mirror at various angles with respect to the foot. Rotation about the pivot shaft is actuated by an electric motor in the foot. The motor is inter-connected with a toggle switch in the handle. Pushing the switch in a particular direction causes the mirror to rotate in that direction. The inspector can place the foot of the device under the vehicle with a pole at an attitude that is chosen to be comfortable. Thereafter, the mirror may be rotated with the switch so as to direct the line of sight at various points under the vehicle body without having to readjust the pole for each angle of view.

A more recent approach to a remote inspection device is disclosed in a U.S. Patent of Rzyski, U.S. Pat. No. 6,369,849. The Rzyski patent discloses a remote inpection devise that includes an elongate housing, camera means and power supply for powering the camera means and video display. The camera means operates in the invisible light spectrum, preferably the infrared (IR) spectrum. The camera means creates an image of an object which is transmitted to the video display for producing a visible light image of the object to be evaluated.

Notwithstanding the above, it is presently believed that there is a need and a potential market for an improved inspection device in accordance with the present invention. There should be a demand because such devices provide a more thorough or more detailed examination of the underside of a vehicle, are less stressful to use and provide better illumination for an inspection. Further, the improved inspection device in accordance with the present invention can be manufactured and sold at a reasonable cost, are durable, easy to use and easily serviced and maintained. In addition, the devices incorporate rechargeable batteries, an indicator that warns a user of a low charge on the battery and are waterproofed in order to be useful in wet weather conditions.

BRIEF SUMMARY OF THE INVENTION

In essence the present invention contemplates an inspection device for inspecting the underside of a motor vehicle for prohibited materials such as explosives, fire arms, drugs or the like. The device includes a carriage or base member and a plurality of wheels for supporting the carriage above the ground and for moving the device over the ground in the vicinity of a motor vehicle. The inspection device also includes a forwardly extending arm fixed to the carriage and having a first end distanced from the carriage. An illumination means or light source is mounted on the arm for illuminating the underside of the vehicle and an upwardly viewing video camera for forming an image of an illuminated portion of the underside of the vehicle being inspected is fixed to a first or forward end of the arm. The camera is positioned to view the underside of the vehicle that is illuminated by the light source. An upwardly extending control arm having an upper portion and a lower portion is fixed to the carrier and extends upwardly from a rear portion thereof with a handle fixed to an upper portion of the control arm. The handle is used for guiding the carriage around the vehicle and for positioning the camera for inspecting the various areas of the underside of a vehicle.

The device also includes a video monitor for viewing an image or picture from the video camera and an electronic control unit for illuminating the light source and activating the camera. In a preferred embodiment of the invention, the video monitor and electronic control unit are fixed to an upper portion of the control arm.

In addition, the device includes a source of power or batteries for illuminating the light source and activating the video camera and monitor. The batteries are mounted on the base member together with a transmitter for transmitting a signal from the video camera to a remote monitor so that another inspector can see the underside of a vehicle. The remote monitor may be located at a distance of about 100 yards from the vehicle. A cable or other conventional link connects the video camera on the electronic control link. Means such as a video display or audio alarm indicates the condition such as the charge on the batteries. In a preferred embodiment, the device operates on 36 volts and incorporates three 12 volt lead acid batteries or the equivalent thereof.

The invention will now be described in connection with the following drawings wherein like reference numerals have been used to indicate like parts.

DESCRIPTION OF THE PREFERRED EMBODIMENTS OF THE INVENTION

Figure 1:
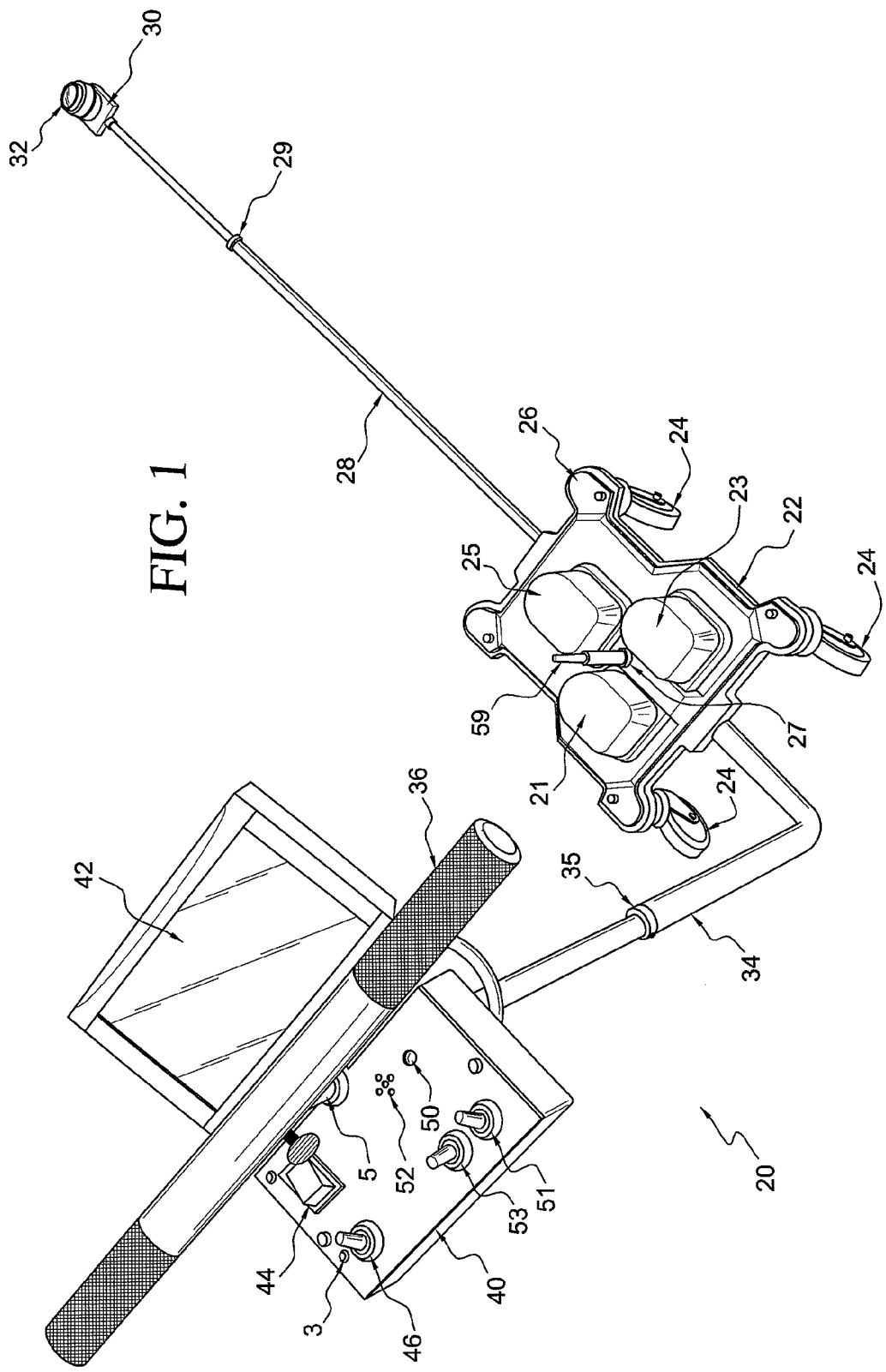
FIG. 1 is a perspective view of an inspection device in accordance with a preferred embodiment of the invention.
Figure 2:
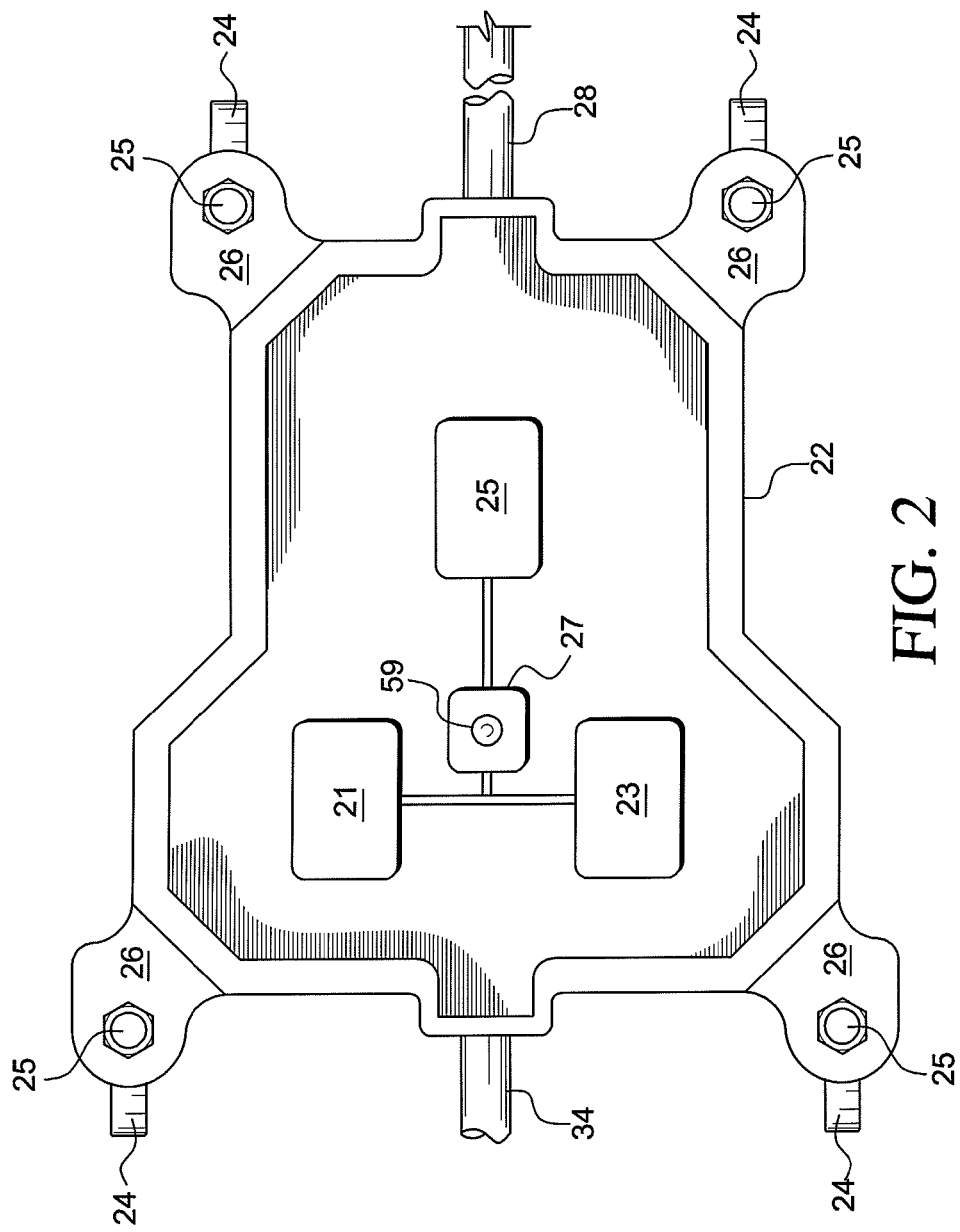
FIG. 2 is a top or plan view of a carriage portion of the inspection device shown in FIG. 1.
Figure 3:
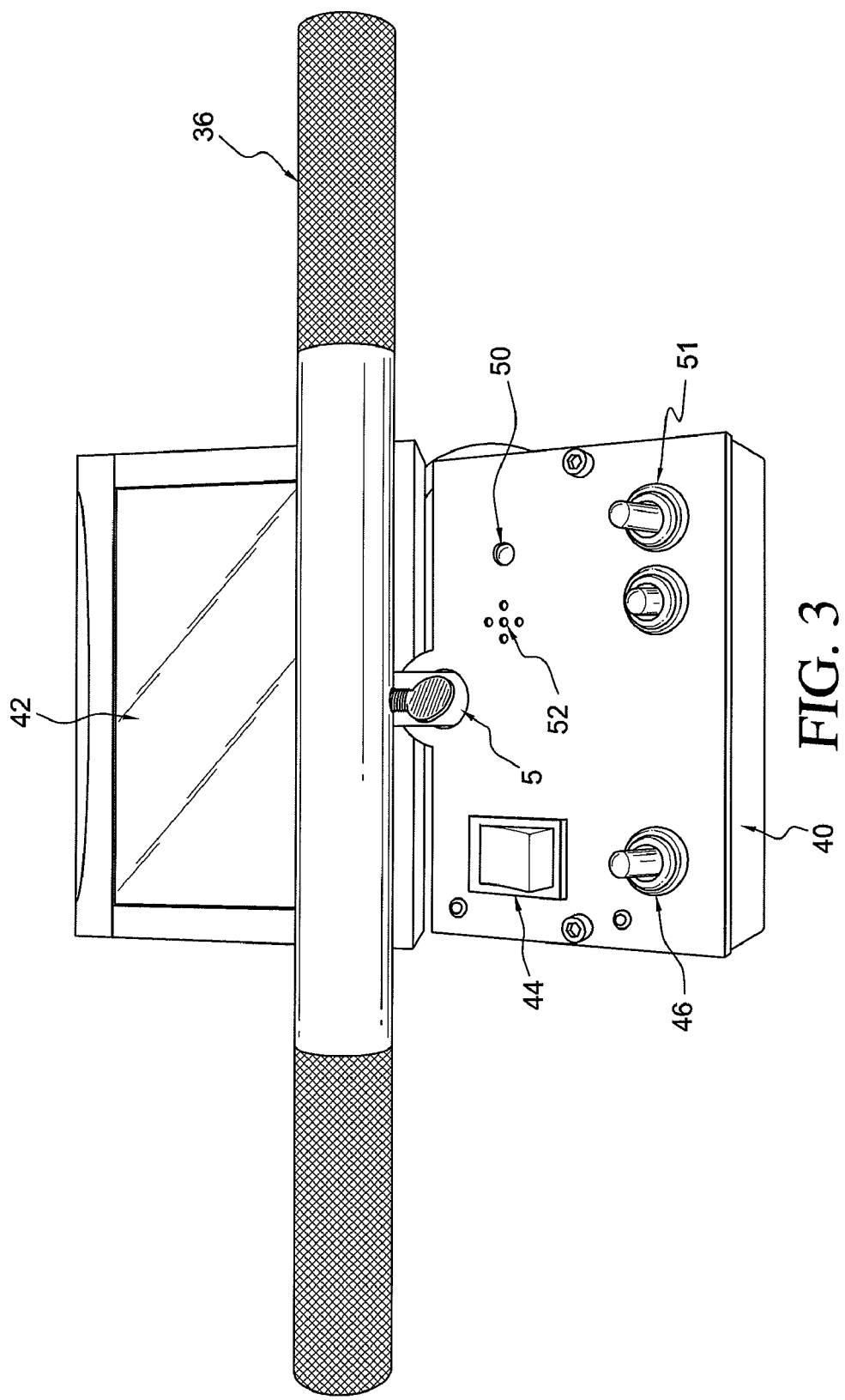
FIG. 3 is a top or plan view of a control unit as used in a preferred embodiment of the invention.
Figure 4:
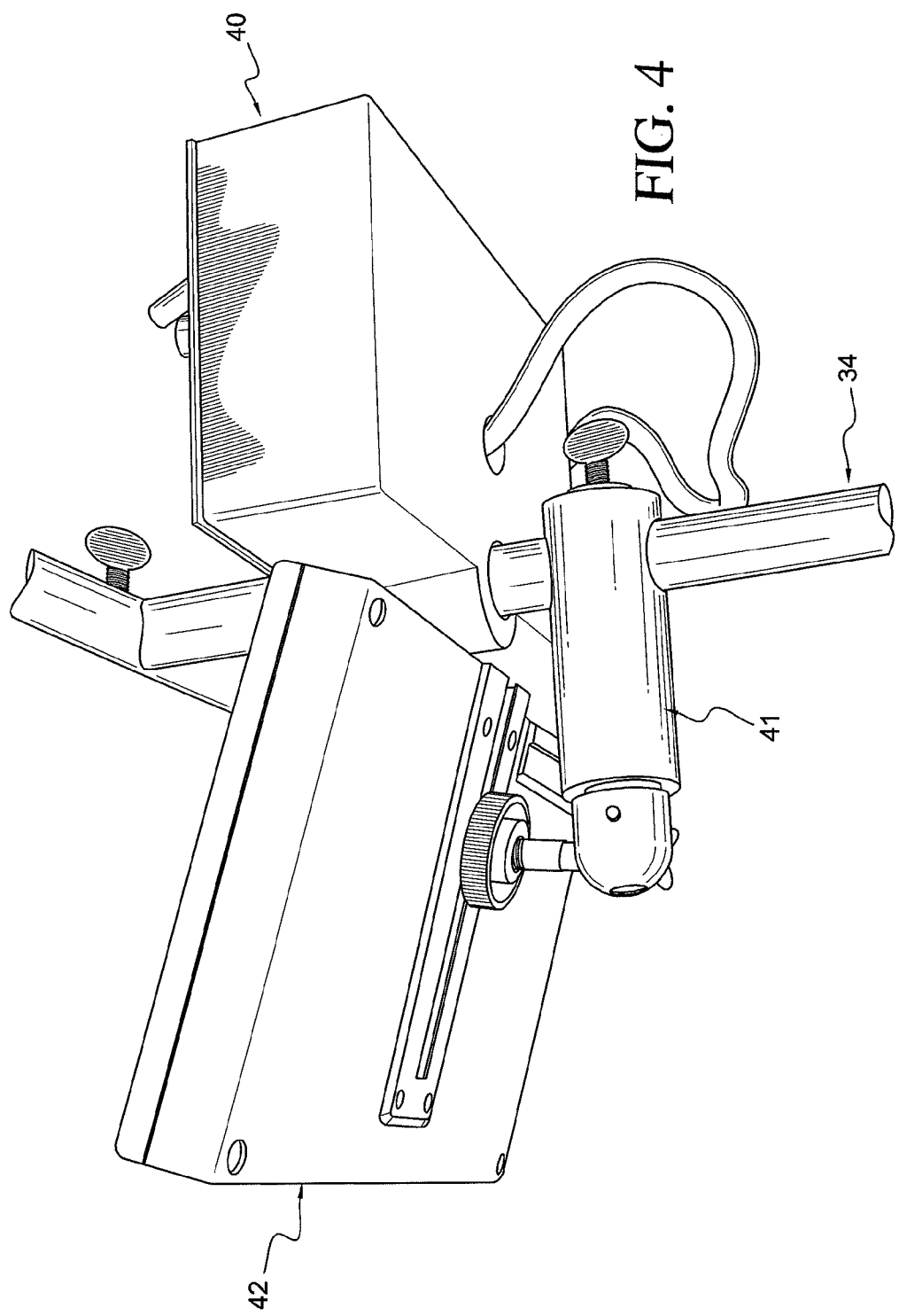
FIG. 4 is a perspective view of a control unit, monitor and mounting assembly as used in the invention.

An inspection device in accordance with a preferred embodiment of the invention is illustrated in FIGS. 1-3 wherein an inspection device 20 includes an octagonal shaped carriage 22 or main body. The carriage 22 is supported above the ground by four wheels 24 that are used to move the device 20 from one area to another and to position the device adjacent to a motor vehicle for inspecting the underside of a motor vehicle.

In a preferred embodiment of the invention, the device 20 is supported by four swiveable wheels 24 each of which swivel about a vertical pivot assembly 25 that are disposed on four outward projections. As shown, the wheels are disposed on four outer projection 26 on four corners of a rectangle to provide a stable platform.

The inspection device 20 also includes a forwardly extending telescopic arm 28 that is fixed to the carriage 22 and extends forwardly from the carriage 22 along a horizontal ax. A conventional telescopic joint 29 allows the length of the arm 28 to be adjusted in a conventional manner to accommodate vehicles of different widths. The forwardly extending arm 28 has a first end that is distanced from the base of the carriage 22 and adapted to extend under a motor vehicle for inspecting the underside thereof. A light source such as an upwardly facing infrared lamp 30 is fixed to a forward portion of the arm 28 for illuminating selected portions of the underside of a vehicle. In addition, an upwardly facing video camera 32 operating in the spectrum of light from the infrared lamp is fixed to the forward end of the arm 28. The camera forms an image of a portion of the underside of the vehicle that is illuminated by the lamp 30.

Three 12 volt batteries 21, 23 and 251 and a TV transmitter 27 (FIG. 2) are disposed on the carriage 22. The batteries 21, 23 and 251 are connected to one another in a series circuit to provide 36 volts for operating the inspection device 20. The TV transmitter 27 is connected to the batteries in a conventional circuit and adapted to transmit a video signal from the video camera to a remote location 31 that is at a distance about 50 to 80 meters from the device. By transmitting the picture to a control room, a second set of eyes can review the image. This is an important feature since inclement weather can have an adverse affect on an individual who is manually maneuvering the device 20 and which may include a separate monitor 42.

An upwardly extending control arm 34 is fixed to a rear portion of the carriage 22 in a conventional manner and extends rearwardly and upwardly. The control arm 34 may also include a conventional telescopic element 35 to allow the height of the control arm to be adjusted to accommodate individuals of different heights. The control arm 34 also includes means for controlling the movement of the carriage 22 and camera 32 such as a handlebar 36 that is used to position the camera 32 under different areas of the underside of a vehicle. A screw 5 fastens the handlebar to the control arm 34.

A control unit 40 and the monitor 42 are mounted or fixed to an upper portion of the control arm 34 and are shown in more detail in FIG. 3. As shown, the monitor 42 may be hingedly mounted to a forward portion of the control unit 40 by a pair of hinges 41 and 43 or by other conventional means. The control unit 40 includes a master switch 44 for activating the device 20 and a vehicle switch 46 for activating the transmitter 27.

The control unit 40 also includes a visual indicator 50 for indicating the condition of the batteries. For example, the indicator 50 may have three lights 50A, 50B and 50C that are red, yellow and green respectively to warn an operator when the batteries need to be recharged. For example, the red light indicates that the batteries have an insufficient charge for continually operating the device, the yellow light indicates when the charge is low and the batteries should be recharged and the green light indicates that the batteries are fully charged. Switch 51 and 53 are provided for testing the charge on the batteries. In addition a speaker 52 may be provided for sounding an alarm when the charge on the batteries is quite low and that the need for recharging the batteries is imminent. The audio alarm is preferably independent of the switch 51. It is presently believed that the need for recharging the battery will occur after about 6 to 8 hours of operation.

While the invention has been disclosed in connection with its preferred embodiment it should be recognized that changes and modifications may be made therein without departing from the scope of the appended claims.

What is claimed is:

1. An inspection device for inspecting the underside of a vehicle for prohibited materials, said device comprising:
   a carriage and a plurality of wheels for supporting said carriage above the ground and moving said carriage over the ground;
   a forwardly extending arm fixed to said carriage and having a first end distanced from said carriage;
   an illumination means fixed to said forward extending arm and positioned to illuminate the underside of a vehicle;
   a video camera operating in the spectrum of light of said illumination means for creating an image of the underside of a vehicle illuminated by said illumination means mounted on said first end of said forwardly extending arm and positioned to view the underside of a vehicle;
   a control arm having an upper portion and a lower portion fixed to said carriage and extending upwardly from a rear portion of said carriage and handle means fixed to said upper portion of said control arm for positioning said carriage near a vehicle and said video camera under various areas of the underside of a vehicle;
   a first video monitor for viewing an image from said video carriage, an electric control unit for illuminating said illumination means and means for activating said camera and wherein said first video monitor and electronic control unit are fixed to said upper portion of said control arm;
   a battery as a source of power for said illumination means, said video camera, said monitor and means for transmitting a signal from said video camera to said first video monitor and wherein said battery and said means for transmitting a signal from said video camera to a second remote monitor are mounted on said carriage; and
   means for indicating the amount of charge on said battery.

2. An inspection device for inspecting the underside of a vehicle according to claim 1 in which the illumination means produces infrared light.

3. An inspection device for inspecting the underside of a vehicle according to claim 2 in which said plurality of wheels includes at least one swivable wheel.

4. An inspection device for inspecting the underside of a vehicle according to claim 3 in which said means for indicating the amount of charge on said battery is a visual display on said control unit.

5. An inspection device for inspecting the underside of a vehicle according to claim 4 wherein said plurality of wheels include four swivable wheel assemblies.

6. An inspection device for inspecting the underside of a vehicle according to claim 5 in which said device includes three 12 volt batteries in series to thereby produce 36 volts.

7. An inspection device for inspecting the underside of a vehicle according to claim 6 which includes means for transmitting an image of the underside of a vehicle to a remote location.

8. An inspection device for inspecting the underside of a vehicle according to claim 3 wherein said means for indicating the condition of said battery is an audio alarm.

9. An inspection device for inspecting the underside of a vehicle according to claim 1 in which said plurality of wheels includes one swivable wheel.

\* \* \* \* \*